United States Patent
Kitchener et al.

(10) Patent No.: US 10,558,326 B2
(45) Date of Patent: Feb. 11, 2020

(54) PROVIDING SUBORDINATE FORUM PORTAL OPTIONS BASED ON RESOURCES

(71) Applicant: International Business Machines Corporation, Armonk, NY (US)

(72) Inventors: Jacob A. Kitchener, Raleigh, NC (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 14/790,180

(22) Filed: Jul. 2, 2015

(65) Prior Publication Data
US 2017/0005968 A1    Jan. 5, 2017

(51) Int. Cl.
| | | |
|---|---|---|
| *G06F 3/048* | (2013.01) | |
| *G06F 3/0482* | (2013.01) | |
| *G06F 16/955* | (2019.01) | |
| *G06F 3/0484* | (2013.01) | |
| *H04L 12/58* | (2006.01) | |
| *H04L 29/08* | (2006.01) | |
| *H04L 29/06* | (2006.01) | |

(52) U.S. Cl.
CPC ........ *G06F 3/0482* (2013.01); *G06F 3/04842* (2013.01); *G06F 16/955* (2019.01); *H04L 51/16* (2013.01); *H04L 67/02* (2013.01); *H04L 67/10* (2013.01); *H04L 67/1097* (2013.01); *H04L 67/42* (2013.01)

(58) Field of Classification Search
CPC .................................................... G06F 3/048
See application file for complete search history.

(56) References Cited

U.S. PATENT DOCUMENTS

| | | |
|---|---|---|
| 6,609,246 B1 | 8/2003 | Guhr et al. |
| 6,718,535 B1 | 4/2004 | Underwood |
| 7,069,308 B2 | 6/2006 | Abrams |
| 7,506,264 B2 | 3/2009 | Polan |
| 8,015,119 B2 | 9/2011 | Buyukkokten et al. |
| 8,478,735 B1 | 7/2013 | Archambault et al. |
| 8,739,112 B1 | 5/2014 | Reed et al. |
| 2002/0085029 A1 | 7/2002 | Ghani |
| 2002/0169782 A1 | 11/2002 | Lehmann et al. |
| 2003/0023624 A1 | 1/2003 | Hamilton, II et al. |
| 2004/0088325 A1 | 5/2004 | Elder et al. |

(Continued)

FOREIGN PATENT DOCUMENTS

WO    2006020758 A2    2/2006

OTHER PUBLICATIONS

Kitchener et al., "Providing Subordinate Forum Portal Options Based on Resources", U.S. Appl. No. 14/852,850, filed Sep. 14, 2015.

(Continued)

*Primary Examiner* — Xuyang Xia
(74) *Attorney, Agent, or Firm* — Nathan M. Rau (57) ABSTRACT

A first user request may be received within a main forum portal that identifies a plurality of resources. The plurality of resources may correspond to one or more user questions about the plurality of resources. At least a first subordinate forum portal of the main forum portal may be identified that is associated with at least one of the plurality of resources. A first option may be provided, based on at least the identifying, the first option for use in joining the first subordinate forum portal.

9 Claims, 7 Drawing Sheets

(56) References Cited

U.S. PATENT DOCUMENTS

| | | | |
|---|---|---|---|
| 2004/0111467 A1* | 6/2004 | Willis | G06F 17/30702 709/203 |
| 2004/0133440 A1 | 7/2004 | Carolan et al. | |
| 2005/0138179 A1 | 6/2005 | Encarnacion et al. | |
| 2005/0149549 A1 | 7/2005 | Jaspers et al. | |
| 2007/0005755 A1 | 1/2007 | Humphries | |
| 2008/0071901 A1 | 3/2008 | Adelman et al. | |
| 2010/0205541 A1* | 8/2010 | Rapaport | G06Q 10/10 715/753 |
| 2010/0228777 A1* | 9/2010 | Imig | G06F 17/30699 707/772 |
| 2011/0022602 A1 | 1/2011 | Luo et al. | |
| 2011/0173198 A1 | 7/2011 | Malleshaiah et al. | |
| 2011/0225511 A1 | 9/2011 | Xu | |
| 2011/0302098 A1 | 12/2011 | Yoshida et al. | |
| 2012/0030238 A1 | 2/2012 | DeLuca et al. | |
| 2012/0150858 A1* | 6/2012 | Ripberger | H04L 67/1097 707/737 |
| 2012/0150912 A1 | 6/2012 | Ripberger | |
| 2012/0290950 A1* | 11/2012 | Rapaport | H04L 51/32 715/753 |
| 2014/0119531 A1 | 5/2014 | Tuchman et al. | |
| 2014/0337750 A1 | 11/2014 | Chang et al. | |
| 2015/0169562 A1 | 6/2015 | Connor et al. | |
| 2015/0235289 A1* | 8/2015 | Jeremias | G06Q 30/0613 705/26.41 |

OTHER PUBLICATIONS

List of IBM Patents or Patent Applications Treated as Related, dated Sep. 11, 2015, pp. 1-2.

Mell et al., "The NIST Definition of Cloud Computing: Recommendations of the National Institute of Standards and Technology," National Institute of Standards and Technology, U.S. Department of Commerce, Special Publication 800-145, Sep. 2011, 7 pages, Gaithersburg, MD.

* cited by examiner

PROVIDING SUBORDINATE FORUM PORTAL OPTIONS BASED ON RESOURCES

BACKGROUND

This disclosure relates generally to discussion forums, and more specifically, to providing subordinate forum portal options based on the resources a user has inquiries about.

A discussion forum (sometimes called a message or discussion board) is a web portal that provides an online exchange of information between users regarding various topics. Discussion forums may include various subordinate forum portals, which are separate web portals that include written posts associated with particular topics. Discussion forum members may post questions, read questions and associated answers, and/or respond to other questions presented by other members. Discussion forums can be entirely anonymous or require authentication information (e.g., a user name and password). A discussion forum administrator or monitor may also participate in a forum. The administrator may modify as well as move or delete particular questions. Moderators may further help the administrator by guiding the discussions to make sure discussion forum rules are being followed.

SUMMARY

One or more embodiments are directed to a computer-implemented method, a system, and a computer program product. A first user request may be received within a main forum portal that identifies a plurality of resources. The plurality of resources may correspond to one or more user questions about the plurality of resources. At least a first subordinate forum portal of the main forum portal may be identified that is associated with at least one of the plurality of resources. A first option may be provided, based on at least the identifying, the first option for use in joining the first subordinate forum portal.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the present disclosure is to cover all modifications, equivalents, and alternatives falling within the spirit and scope of the present disclosure.

DETAILED DESCRIPTION

Aspects of the present disclosure generally relate to providing subordinate forum portal options based on the resources a user has inquiries about. While the present disclosure is not necessarily limited to such applications, various aspects of the disclosure may be appreciated through a discussion of various examples using this context.

A common option for users today to resolve a question is to utilize a non-private search engine to search for answers. The shortcoming with this method is that the user may arduously parse through various returned results and have to search for particular answers to the questions, which may waste valuable time. The user may therefore have extreme difficulty in finding a matching answer result to their questions. For example, the user may have a technical question that involves running the resources of application A, application B, and application C. Application B may perform a core dump (e.g., the copying to hard disk the contents of RAM at one moment in time). The user may question why application B performs the core dump when running these applications together. Because this question and problem is particularized, it may be arduous for a user to search for and find a direct match to this question.

Another common option for users to resolve a question is to utilize a specialized discussion forum. Users within these forums may either directly post a question to the forum or search for various threads to find as close a match as possible to their questions. If the discussion forum includes subordinate forums dedicated to particular resources or topics, the user may search each of the subordinate forums and try to find answers to their question. The users may accordingly have to parse through various threads and/or subordinate forums, which may waste valuable time. Moreover, if a user merely posts a question without searching for particularized threads or subordinate forums, the question may not be seen by those who are capable of answering the question. Accordingly, embodiments of the present disclosure are directed to identifying, within a main forum portal, particular resources that the user has a question about, determining whether a subordinate forum portal of the main forum portal specifies at least one of the particular resources, and providing, based on at least the determining, a subordinate forum portal option for a user to join in order to answer the user's question. As disclosed herein, the term "main forum portal" in some cases refers to a main discussion board or forum, main website, or the like. Moreover, the term "subordinate forum portal," as disclosed herein refers a child (or alternate) subordinate discussion board or forum, website, chat room, or the like in relation to the main forum portal. As disclosed herein, the term "resources," may mean apparatuses, components of apparatuses, systems, other tangible items, program applications, formulas, compounds, methods (e.g., how to perform a certain step or action), or the like.

Figure 1:
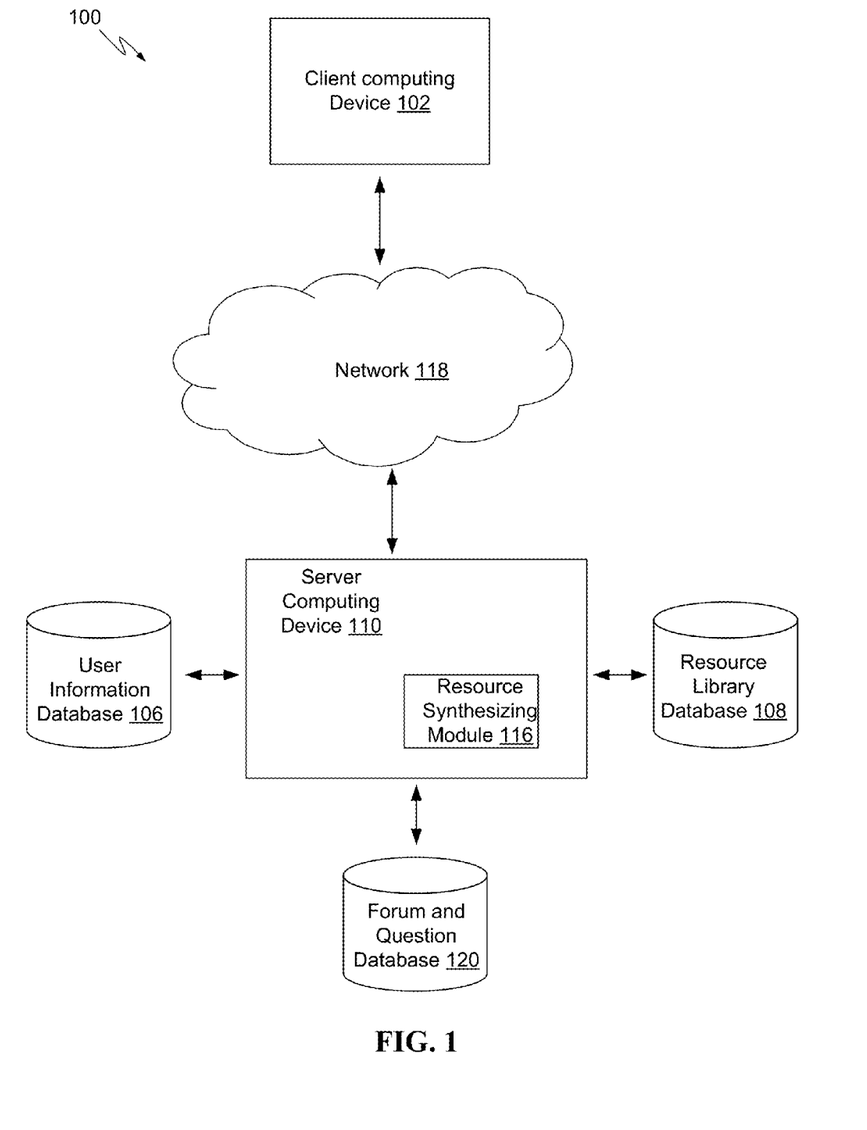
FIG. 1 is a block diagram of an example forum portal environment, according to embodiments.

FIG. 1 is a block diagram of an example forum portal environment 100, according to embodiments. The forum portal environment 100 includes a first client computing device 102 (e.g., a handheld device, laptop, desktop, etc.), one or more server computing devices 110, a network 118, a user information database 106, a resource library database 108, and a forum and question database 120. The server computing device 110 also includes a resource synthesizing module 116. In an embodiment, the forum portal environment 100 is the cloud computing environment 50 of FIG. 5 (or included in the cloud computing environment 50), as described herein.

Figure 4:
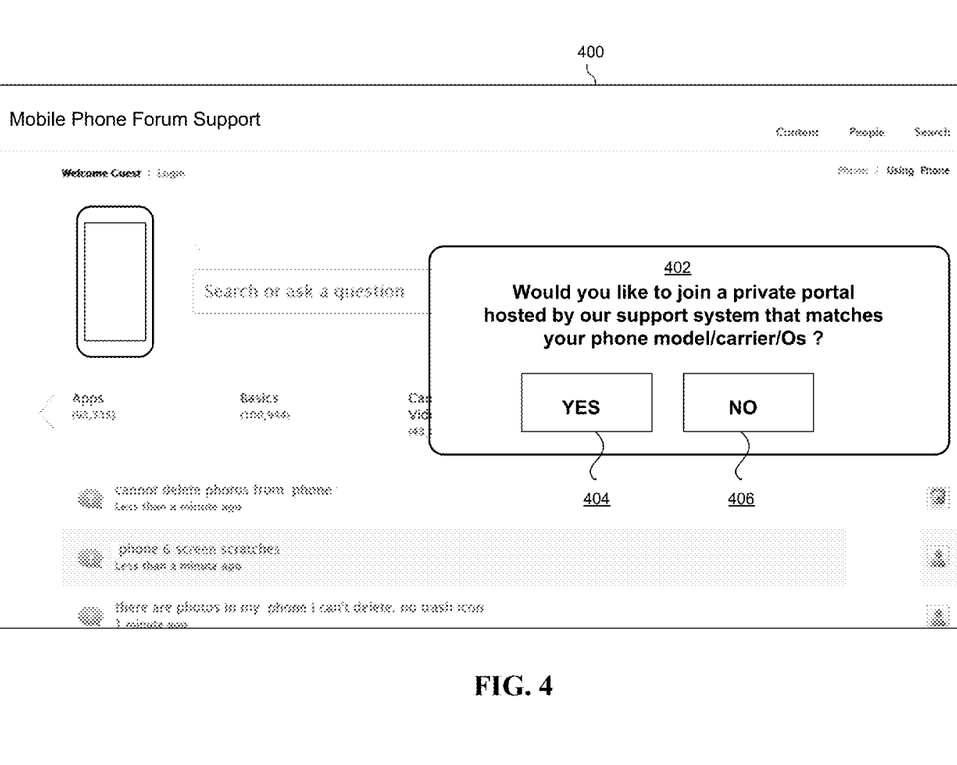
FIG. 4 is a diagram of an example screenshot of a main forum portal and a notification inquiring whether the user wants to join a subordinate forum portal based on the resources the user has a question about, according to embodiments.
Figure 5:
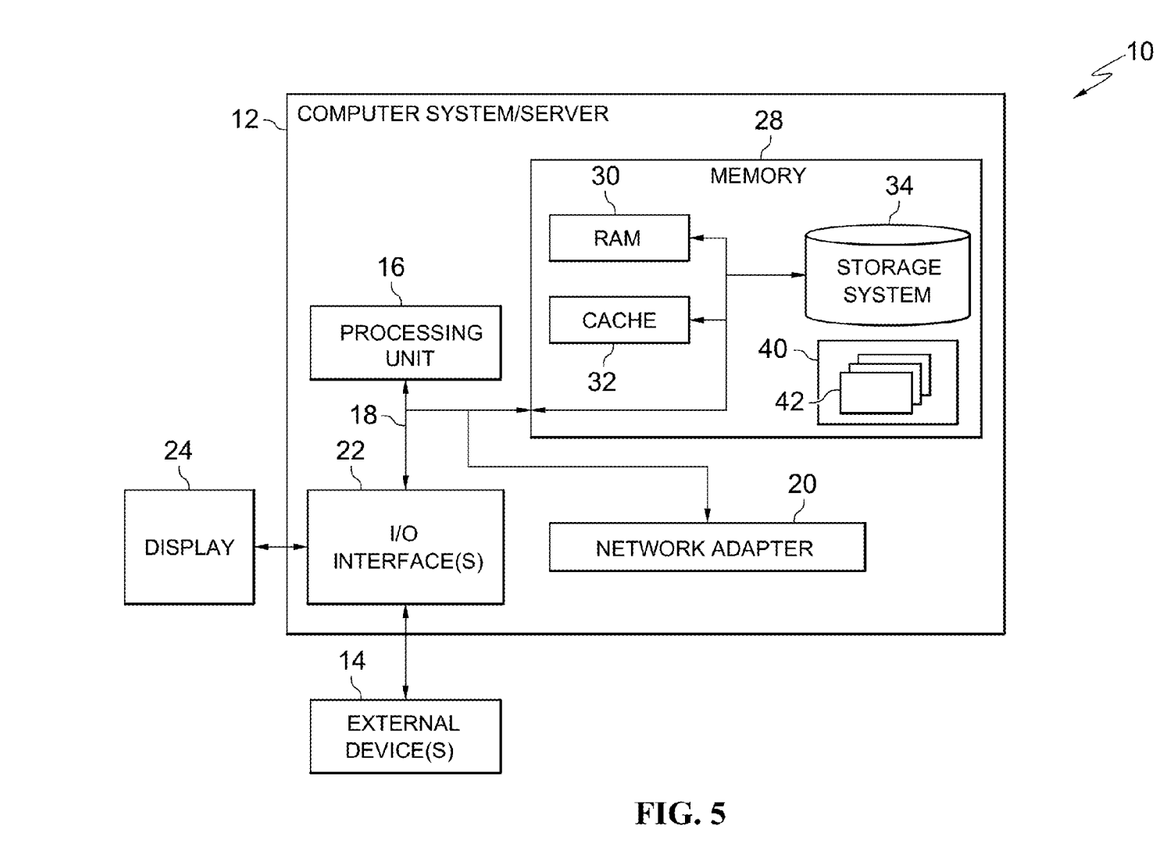
FIG. 5 depicts a cloud computing node according to embodiments of the present disclosure.

In an embodiment, the client computing device 102 and/or the server computing devices 110 can be configured the same or analogous to the computer system/server 12, as specified in FIG. 4 or cloud computing nodes of FIG. 5 (e.g., 54A, 54B, 54C, and/or 54N). The client computing device 102 may establish a connection with the server computing device 110 via one or more networks 118, such as a local area network (LAN), a general wide area network (WAN), and/or a public network (e.g., the Internet).

In an embodiment, the client computing device 102 establishes a connection, via the network 118, with the server computing device 110, which may correspond to a user entering or accessing a main forum portal. Upon entering the main forum portal, the user may request one or more resources that the user has a question about. For example, a user may utilize a graphical user interface of the main forum portal to select a menu that specifies various technological resources. The user may select application A and application B as the desired resources. Accordingly, the server computing device 110 may identify and locate application A and application B within the resource library database 108. In an embodiment, the resource library database 108 includes each resource within the main forum portal that each user has discussed. In other embodiments, the resource library database 108 includes predetermined resources that users may not have necessarily discussed. In an embodiment, in response to the server computing device 110 locating the specified resources via the resource library database 108, the server computing device 110 provides, via the resource synthesizing module 116, one or more subordinate forum portal options of the main forum based on the identifying of the resources, which is discussed in more detail below. The one or more subordinate forum portal options are for use in answering the users question according to the resources the user has a question about.

In one embodiment, the resource synthesizing module 116 matches (e.g., via natural language processing (NLP)) the resources requested within the resource library database 108 to the resources as found within the forum and question database 120 (i.e., the resources found in various subordinate forum portals that include discussion of the resources). The forum and question database 120 includes each subordinate portal forum, thread, and/or posts (e.g., questions and answers) of the main portal forum. In an embodiment, as described in more detail below, the user's computing device displays options for each subordinate forum portal that discuss one or more of the requested resources and the user may accordingly select a subordinate forum portal and generate a question within the subordinate forum portal.

In an embodiment, the server computing device 110 further includes a user information database 106. The user information database 106 stores each of the forum members' names, authentication information (e.g., usernames and passwords, etc.), and/or other user information.

Figure 2:
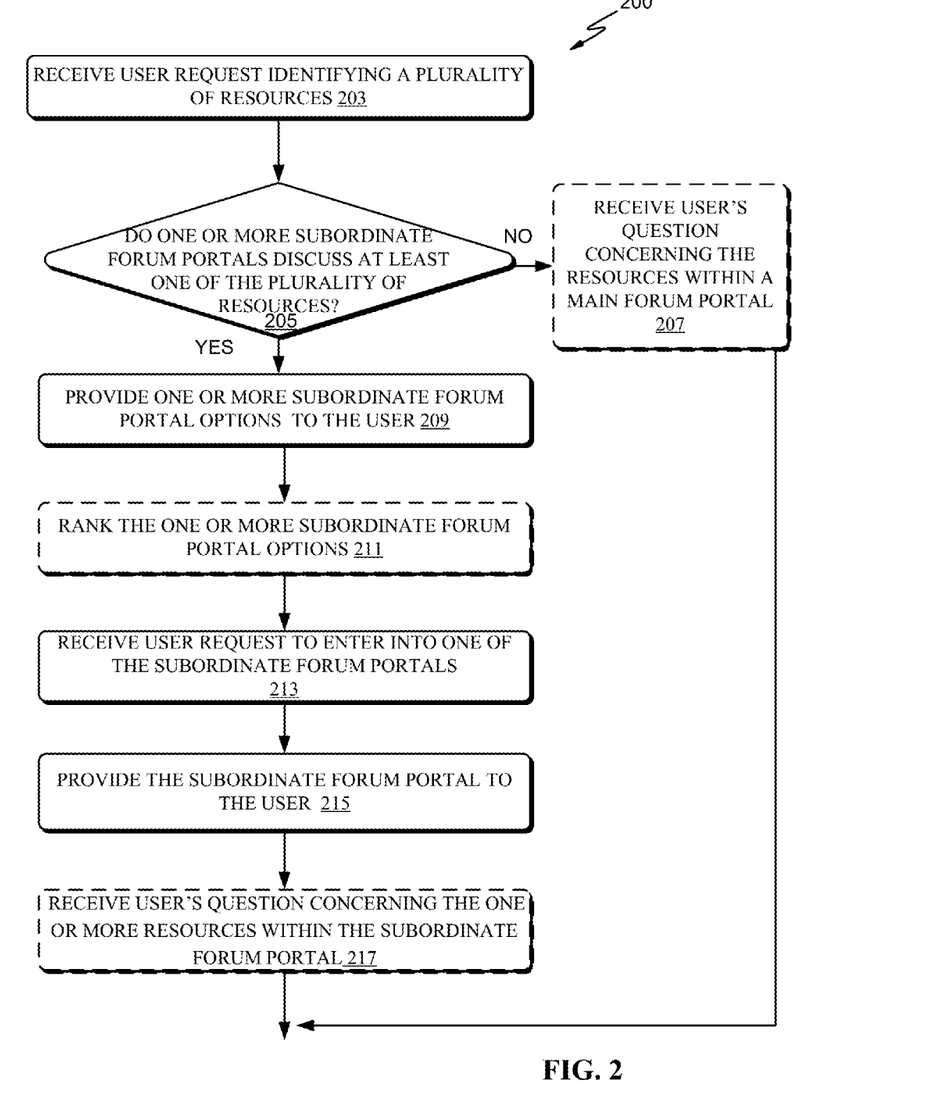
FIG. 2 is a flow diagram of an example process for receiving a user request that identifies a plurality of resources, and based on the request, providing various subordinate forum portal options to discuss one or more resources, according to embodiments.

FIG. 2 is a flow diagram of an example process 200 for providing one or more subordinate forum portal options to a user. In an embodiment, the process 200 begins when a server computing device, per block 203, receives a user request that identifies a plurality of resources. In these embodiments, the user first accesses the main forum portal and selects particular resources. For example, the main forum portal may be a graphical user interface that includes a menu. The user may select the menu, which includes a drop down list of each of the resources found within a server data store (e.g., each of the resources found within the resource library database 108 of FIG. 1) that are discussed by other users. The user may select which resource he or she has a question about. For example, the user may select from the menu the resources of "Application A," "Application B," "Application C," "a 4-core CPU," and "32 GB of random access memory (RAM)." The user request is associated with a question regarding these resources. For example, the user may desire to post the question of: "when I am running application A, application B with a 4-core CPU, application C, on 32 GB of RAM, sometimes application B core dumps after two hours. Has anyone seen this?" In some embodiments, the user may provide user input that ranks the plurality of resources according to the user's preference. The ranking may be a weighted preference of resources that the user needs and does not necessarily need in order to answer his or her question. For example, using the illustration above, although the user's resources include a 4-core CPU, the user may not necessarily need to answer his or her question using the 4-core CPU, but the CPU may include any number of cores. However, the user may need application A, B, and C to answer his or her question. Accordingly, the user may specify the resources he or she absolutely needs and does not need in order to answer the question. In some embodiments, and as discussed in more detail below, the providing of various subordinate forum portal options may be based on the user ranking the plurality of resources according to his or her preference.

Per block 205, a server computing device determines whether there are one or more subordinate forum portals that discuss at least one of the plurality of resources. The server computing device may determine whether there are one or more subordinate forum portals that discuss the requested resources in various manners. For example, in one embodiment, in response to the user request per block 203, the server computing device matches the requested resources to the resources discussed by other users in subordinate forum portals (e.g., match the requested resources as found in the resource library database 108 to subordinate forum portals posts within the forum and question database 120). For example, the user may have selected from a menu within a main forum portal, the resources of "SQL" and "index rebuilding." Accordingly, the server computing device searches the forum and question database 120 for the resources "SQL" and "index/rebuild" to determine if any other users had questions or answers that are associated with these resources. The "index rebuild" and "SQL" resources may correspond to the question of "how often should I rebuild indexes on my SQL server?"

In an embodiment, if there are no subordinate forum portals discuss (i.e., are associated with) any of the resources the user requests, then per block 207, the server computing device receives the user's question concerning the one or more resources within a main forum portal. For example, the user may generate his or her question within a field of the main forum portal and wait for a corresponding response to his or her question. In other situations, the user may search the main forum portal or subordinate forum portals for related answers to the user's question.

Per block 209, if the server computing device identifies at least one subordinate forum portal that discusses at least one of the requested resources, the server computing device provides one or more subordinate forum portal options for use in joining the one or more subordinate forum portals. As disclosed herein, to "provide" one or more options (subordinate forum portal options) may mean that the server computing device associated with the main and subordinate forum portals may cause a client computing device to display various subordinate forum portal options. In an example illustration, using the example above, the server computing device may have identified only two subordinate forum portals that discuss "SQL" and/or "index rebuilding." Consequently, the server computing device transmits a message to the client computing device causing the client computing device to display two options (associated with the two subordinate forum portals) for a user to select and discuss his or her question. In some embodiments, the providing of one or more subordinate forum portal options may be based on the user ranking the plurality of resources according to his or her preference, as discussed above. For example, the user may need application A, and B to answer his or her question, but not necessarily application C. Accordingly, the server computing device may provide weighted options based on the user's selected preferences or needs.

In an illustrative example of block 209, the resources identified in may be: application A, application B, application C, and a container with a four-core central processing unit (CPU), 32 GB of random access memory (RAM), and 2 TB of storage. The providing of various subordinate forum portals options concerning these resources may be as follows: "Portal A: This portal contains a social media group in which the users have discussed application A and application B only;" "Portal B: This portal contains a social media group in which the users have discussed application B and application C only;" and "Portal C: This portal contains a social media group in which the user have discussed application A, application B, and application C, but the container includes a two-core CPU and 16 GB of RAM." A user may select which subordinate forum portal option he or she desires to discuss the input question in and the client computing device receives the user request (block 213) to enter into one of the subordinate forum portals in order to post the question.

In some embodiments, the server computing device may include an associated matching percentage for each of the subordinate forum portal options identified. The matching percentage indicates a percentage of the plurality resources that are identified in each of the plurality of subordinate forum portals. For example, a user's question may include 4 resources (e.g., application X, application Y, application Z, and application D), and a server computing device causes a client computing device to display a matching percentage for each subordinate forum portal option that meets all of the resources specified as follows: "Forum A: there is a 25% match for the resources identified (application X);" "Forum B: there is a 50% match for the resources identified (application X, and application Y);" and "Forum C: there is a 100% match for the resources identified (application X, application Y, and application Z)."

In an embodiment, per block 211, the server computing device ranks the subordinate forum options. For example, using matching percentage identified above, the server computing device ranks (i.e., recommends) Forum C as the first forum choice to post the question because there is a 100% match with the resources identified. For the same matching percentage reasons, forum B is the second recommended option, and Forum C is the third recommended option.

In an embodiment, the ranking or recommending of particular subordinate forum portals is based on a quantity of users associated with each of the plurality of subordinate forum portals and further based on an activity level within each of the plurality of subordinate forum portals. For example, using the illustration above, even though subordinate forum portal C includes a 100% match for the resources identified, there may only be two users who have started the forum and none of them have posted for two years. Alternatively, subordinate forum portal B may include 300 users and have an average update of 11.2 messages per day. Accordingly, the server computing device may rank or recommend Forum B as the Forum to join because of combining multiple factors of matching percentage, activity level of the forums, and the amount of users. In some embodiments, each factor may be weighted differently to determine which subordinate forum portal to rank the highest or recommend. The server computing device may utilize any suitable method to identify activity level or amount of users, such as natural language processing (NLP), polling methods, or any other suitable method. In some embodiments, the ranking may further be based on receiving user input, the user input ranking the plurality of resources according to a user's preference, as discussed above.

The user may then select one of the options and per block 213, the server computing device receives the user request to enter into one of the subordinate forum portals such that the server computing device provides, per block 215, the subordinate forum portal to the user (e.g., the server computing device causes a user's client computing device to display the subordinate forum portal). In some embodiments, the user may desire to post a question within the subordinate forum portal and the server computing device receives the user's question within the selected subordinate forum portal, per block 217. In some situations, the user may read the subordinate forum portal posts and find the same question that the user had is already posted to the subordinate forum portal. Accordingly, the server computing device may not necessarily receive a user's question within the subordinate forum portal.

Figure 3:
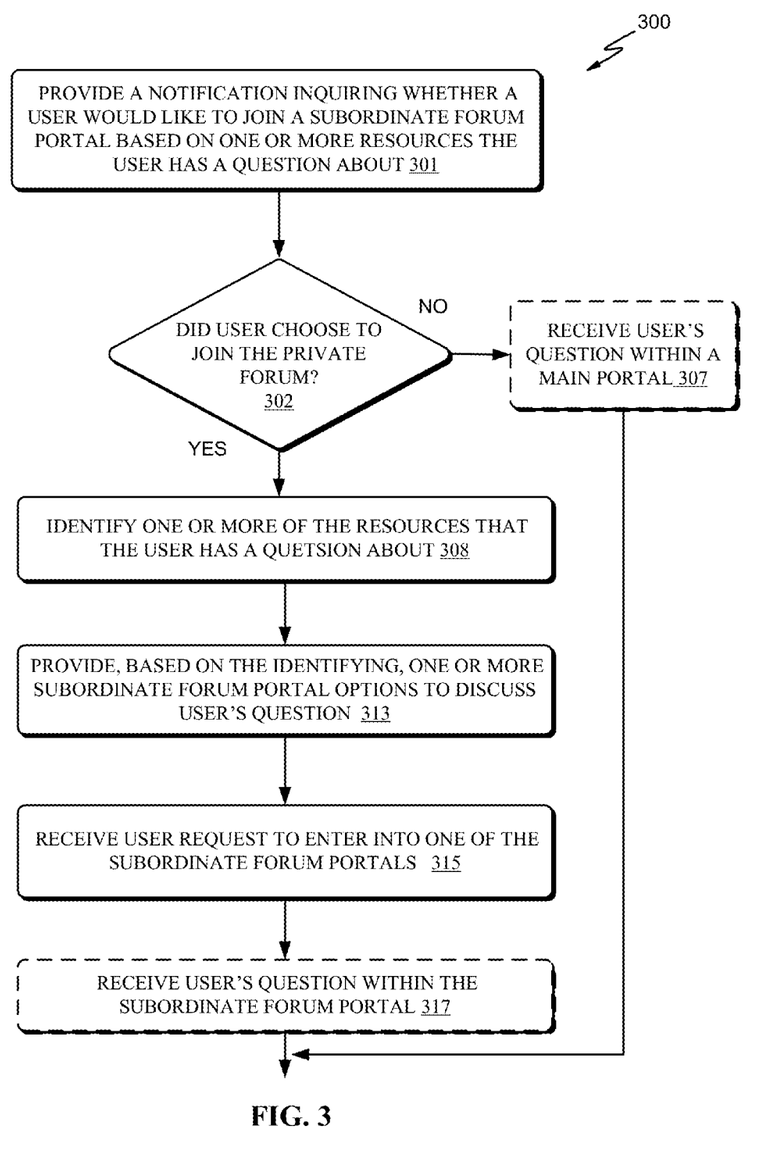
FIG. 3 is a flow diagram of an example process for identifying on or more resources that a user has a question about and providing various subordinate forum portal options accordingly, consistent with embodiments.

FIG. 3 is a flow diagram of one embodiment of an example process 300 for identifying one or more resources that a user has a question about and providing various subordinate forum portal options accordingly. In an embodiment, as soon as a user accesses a main forum portal website, the associated server computing device, per block 301, provides a notification to a client computing device. The client computing device displays the notification as an inquiry of whether a user would like to join a subordinate forum portal based on one or more resources the user has a question about. The server computing device then determines whether the user chose to join the subordinate forum portal based on the notification, per block 302. If the user did not choose to join the subordinate forum portal, then in an embodiment, per block 307, the server computing device receives the user's question within a main forum portal. Alternatively, the user may not necessarily generate a question but searches for similar questions that the user has compared to his or her own. Consequently, the server computing device may not necessarily receive a user's question within a main forum portal.

If the user chooses to join a subordinate forum portal, then per block 308, the server computing device identifies one or more of the resources that the user has a question about. For example, a user may have a question about his or her mobile phone device and a server computing device may identify the model, carrier, and or operating system (the resources) of the mobile phone device. In these embodiments, a user may have a Universal Serial Bus (USB) connector and plug the connector into his or her mobile phone at a first end (e.g., via a micro USB port of the mobile phone device) and into the user's computing device at a second end of the connector via a USB port of the user's computing device. When a user establishes a connection between the mobile phone device and the user's computing device, the names of the identified resources may be transmitted from the mobile phone to the computing device and when the user logs onto the main forum portal, the user's computing device may transmit the names of the resources (e.g., the model, carrier, and/or operating system of the mobile phone) to the server computing device associated with the main forum portal.

In an embodiment, the server computing device performs block 308 by causing a second notification to be displayed to a user computing device that prompts a user to select which resources he or she has a question about and based on the user selection, the server computing device identifies the resources. In other embodiments, the user issues a request to discuss particular resources. For example, within a main forum portal GUI, the user selects a menu that includes common resources (e.g., corresponding to the resource library 108 of FIG. 1) discussed by other members and the user may select which resource he or she has a question about.

In an embodiment, per block 313, the server computing device provides, based on at least the identifying of one or more resources (block 308), various subordinate forum portal options to discuss the user's question. Accordingly, the server computing device causes to be displayed at the client computing device options of various subordinate forum portals that the user may select to answer his or her question. As discussed above, the providing of various subordinate forum portal options may be performed in various manners. Per block 315, the server computing device may receive a user request to enter into one of the various subordinate forum portals to post the question or the user may search for a question similar to the one he or she has. In an embodiment, a user generates a question within one of the selected subordinate forum portals and the server computing device, per block 317, receives the user's question.

FIG. 4 is a diagram of an example screenshot of a main forum portal 400 and a notification inquiring whether the user wants to join a private portal (e.g., a private subordinate forum portal) based on the resources the user has a question about, according to embodiments. In the example embodiment shown in FIG. 4, the screenshot of the main forum portal 400 includes a GUI that contains a notification 402, a "yes" control button 404, and a "no" control button 406. In some embodiments, a "private" subordinate forum portal may be private such that no user may have access to the subordinate forum portals unless provided by the server computing device based on the user's request for resources and the providing and selection of subordinate forum portal options. The private portals may also be private such that members may not be able to decipher whether other users work for competing entities.

In an example illustration, a user may have a problem with a particular mobile phone and desire to seek an answer to a question the user has about the mobile phone. The user may first access the main forum portal 400. In an embodiment, as soon as the user logs onto the main forum portal 400, an associated server computing device causes the user's client computing device to display the notification 402. The notification 402, as illustrated in FIG. 4, includes the inquiry: "Would you like to join a private portal hosted by our support system that matches your phone model/carrier/OS?" Accordingly, this inquiry specifies whether the user would like to join a subordinate forum portal of the main forum portal based on one or more resources (e.g., the model, carrier, and the operating system (OS) of the mobile phone) the user has a question about. If the user desires to join the subordinate forum portal that matches the resources of the mobile phone, the user may select the "yes" control button 404 to request the corresponding subordinate forum portal. Accordingly, as described above, the server computing device identifies the model, carrier, and/or operating system of the mobile phone and matches the particular resources to those resources as found in other subordinate forum portals discussed by other members or users. The user may also select the "no" control button 406 in order to stay on the main forum portal. In some examples, the "no" control button 406 may be selected if the user wants to look at various discussion threads within the main forum portal that correspond to multiple questions a user has.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
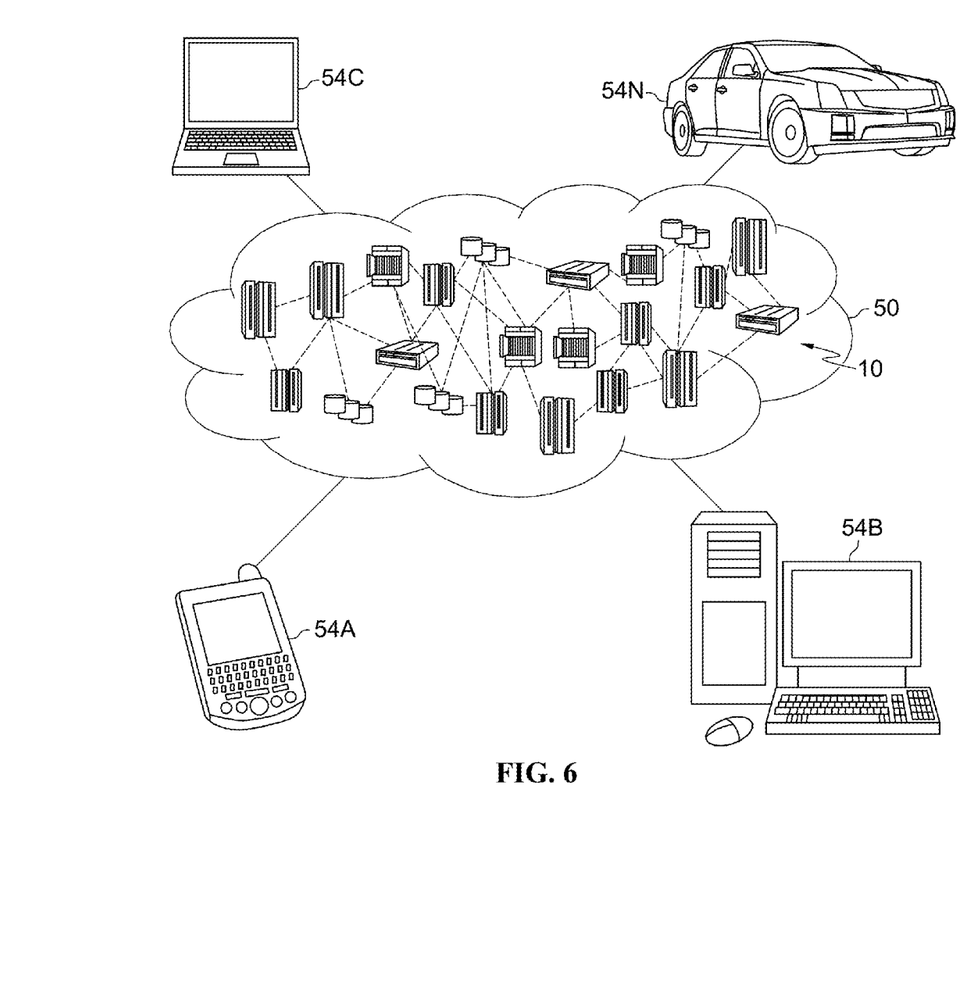
FIG. 6 depicts a cloud computing environment according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
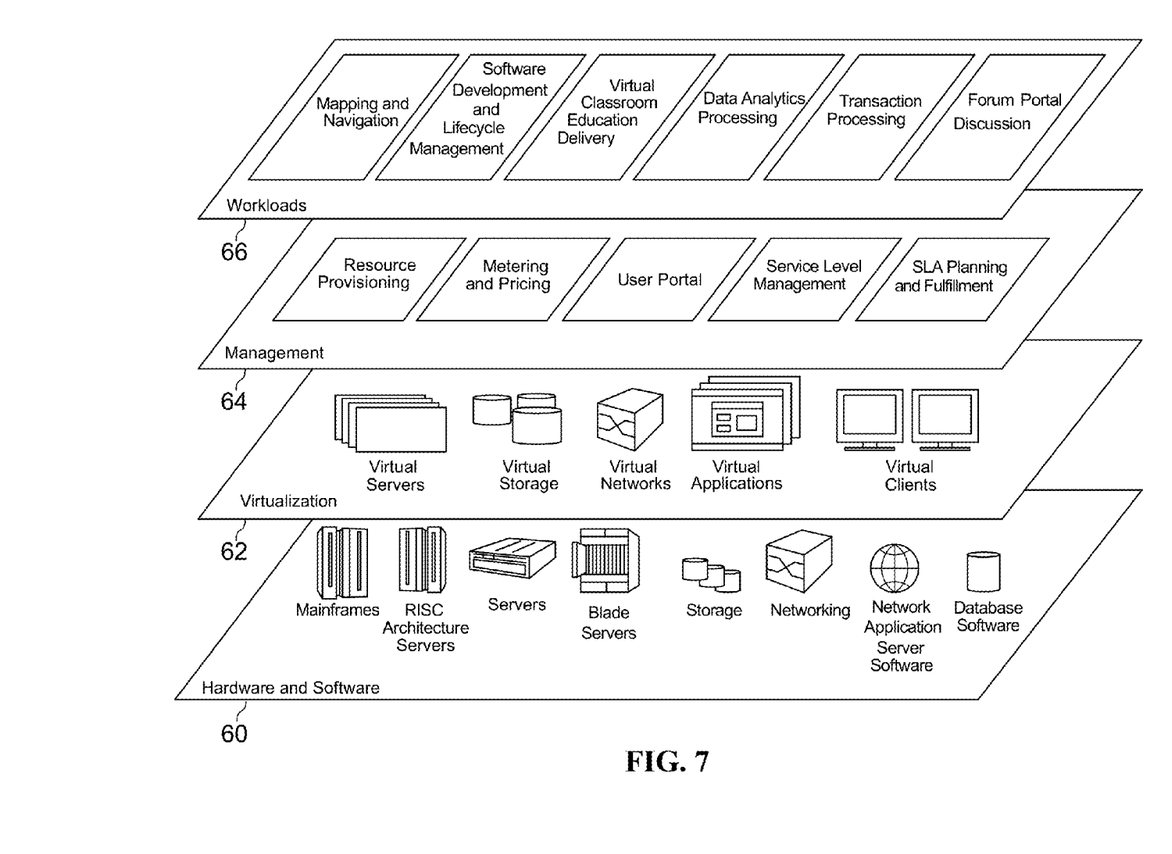
FIG. 7 depicts abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In an embodiment, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and forum portal discussion 96.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system of providing subordinate forum portal options based on a plurality of resources a user has inquiries about, the system comprising:
    a memory;
    at least one processor circuit in communication with the memory, wherein the at least one processor circuit is configured to perform a method, the method comprising:
        causing a notification to be displayed at a first computing device, the notification including an inquiry to a user associated with the first computing device to join a subordinate forum portal of a main forum portal based on one or more resources from the plurality of resources the user has a question about, the notification including a first control button associated with a first user request to join the subordinate forum portal, the notification further including a second control button associated with a second user request to not join the subordinate forum portal;
        receiving the first user request to join the subordinate forum portal based on a selection of the first control button;
        identifying, programmatically, the one or more resources of the user, wherein the one or more resources of the user include one or more resources selected from the group comprising apparatuses, components of apparatuses, systems, or program applications, and wherein the one or more resources are part of a computing system associated with the user;
        determining that a first subordinate forum portal of the main forum portal is associated with at least one of the one or more resources; and
        providing, based on at least the determining, a first option for the user to join the first subordinate forum portal.

2. The system of claim 1, wherein the method further comprises:

determining that a second subordinate forum portal of the main forum portal is associated with at least one of the plurality of resources, the second subordinate forum portal corresponds to a second website, wherein the main forum portal is a first website;

providing, based on at least the determining that the second subordinate forum portal is associated with at least one of the plurality of resources, a second option for use in joining the second subordinate forum portal, the providing includes displaying a name of the second subordinate forum portal and the providing further includes identifying which of the at least one of the plurality of resources are included within the second subordinate forum portal; and receiving a third user request to join the first subordinate forum portal.

3. The system of claim 2, wherein the method further comprises:

providing the first subordinate forum portal by causing the computing device to display the first subordinate forum portal; and receiving the question within the first subordinate forum portal.

4. The system of claim 2, wherein the method further comprises providing a first matching percentage for the first option and a second matching percentage for the second option, the first matching percentage indicating a percentage of the plurality of resources that are identified in the first subordinate forum portal, and the second matching percentage indicating a percentage of the plurality of resources that are identified in the second subordinate forum portal.

5. The system of claim 2, wherein the method further comprises ranking the first option and the second option.

6. The system of claim 5, wherein the ranking is based on a quantity of users associated with the first subordinate forum portal and the second subordinate forum portal and further based on an activity level within the first subordinate forum portal and the second subordinate forum portal.

7. The system of claim 5, wherein the ranking is further based on a first matching percentage of the first option and a second matching percentage of the second option, the first matching percentage indicating a percentage of the plurality of resources that are identified in the first subordinate portal, and the second matching percentage indicating a percentage of the plurality of resources that are identified in the second subordinate forum portal.

8. The system of claim 1, wherein the method further comprises receiving user's input, the user's input ranking the plurality of resources according to the user's preference, wherein the providing of the first option is further based on the user input.

9. The system of claim 1, wherein the main forum portal includes a graphical user interface that includes a menu, the menu includes a drop down list of the plurality of resources, wherein the identifying of the one or more resources includes receiving a user selection request of the one or more resources within the drop down list.

* * * * *